No. 789,606. PATENTED MAY 9, 1905.
M. S. GORDON.
TIRE.
APPLICATION FILED NOV. 12, 1904.

Witnesses
Wm. J. Korth,
C. C. Hines.

Inventor
Mary S. Gordon,
By Victor J. Evans
Attorney

No. 789,606. Patented May 9, 1905.

UNITED STATES PATENT OFFICE.

MARY S. GORDON, OF AUSTIN, TEXAS.

TIRE.

SPECIFICATION forming part of Letters Patent No. 789,606, dated May 9, 1905.

Application filed November 12, 1904. Serial No. 232,536.

*To all whom it may concern:*

Be it known that I, MARY S. GORDON, a citizen of the United States, residing at Austin, in the county of Travis and State of Texas, have invented new and useful Improvements in Tires, of which the following is a specification.

My invention relates to improvements in tires for vehicle-wheels, and particularly to tires of that class consisting of a tread portion and flanges or side pieces, the latter being arranged to bear upon opposite sides of the wheel-felly and constituting with the tread portion an inclosure for the entire surface of the felly, with the exception of the inner surface or periphery thereof, whereby the felly is protected from extraneous shocks or blows and the life of this portion of the felly prolonged.

The object of the invention is to provide a tire of this type embodying improved features of construction, to facilitate the application and removal of the tire, which will maintain the parts in firm engagement against casual disconnection or displacement, and which will effectually prevent the access of sand, grit, and dirt between the tire and felly, and thus better protect the latter from wear.

With this and other objects in view the invention consists of the features of construction, combination, and arrangement of parts hereinafter fully described and claimed, reference being had to the accompanying drawings, in which—

Figure 1:
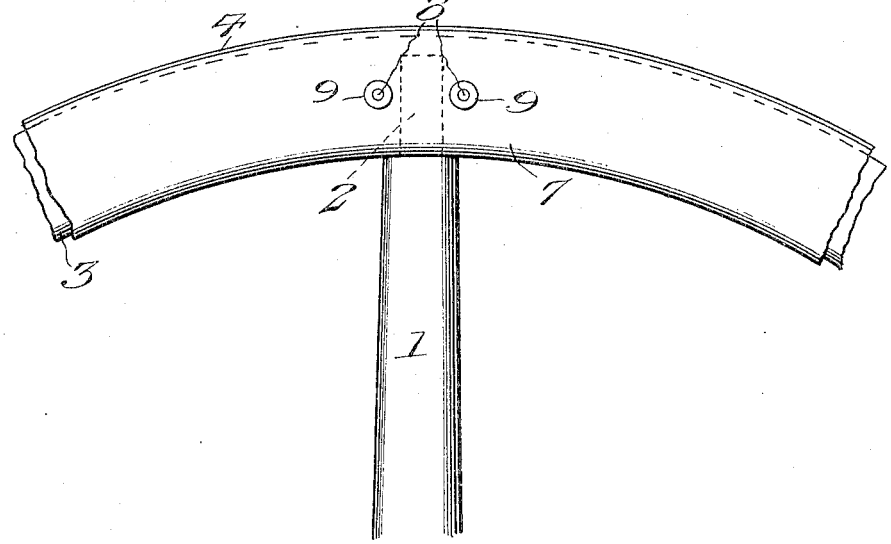
Figure 2:
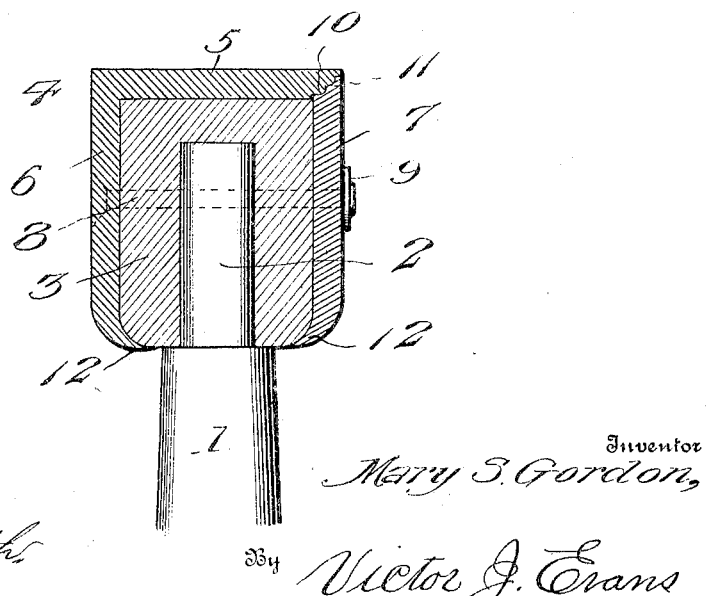

Figure 1 is a view in side elevation of a portion of a vehicle-wheel embodying my invention, and Fig. 2 is a cross-section of the same.

Referring now more particularly to the drawings, 1 represents the spoke of a wheel, which may be of any ordinary construction and which is provided with a tenon 2 to fit within the usual mortise or socket in the wheel-felly 3.

The tire 4 applied to the felly is formed of two parts, one of said parts comprising a tread plate or portion 5 and a side flange or plate 6, the latter being arranged to bear against one of the sides of the felly 3 and constituting an integral extension from the tread-plate 5. The other portion or part of the tire consists of a side plate 7, which is arranged to bear upon the opposite side of the felly from the plate 6, the tread-plate 5 and side plates 6 and 7 forming an inclosure for the tread portion and sides of the felly to protect the same from extraneous shocks or blows, and thereby prolong the life of the felly. The portions 5 and 6 of the tire may be shrunk upon the felly to effect a close engagement therewith, if desired; but this operation is not absolutely essential, as the members of the tire may be made to conform closely to the shape of the felly and fit snugly thereon without the aid of heat. It will be understood, of course, that the tire may consist of two or more segments to adapt it to be readily applied and secured in position upon the felly.

The tire is fastened to the felly by means of rivets 8 passing transversely through the felly and side plates 6 and 7, the head of the rivet being preferably countersunk in the plate 6 and the opposite end thereof upset against a washer 9, bearing against the plate 7 to securely retain the parts in assembled relation. In order to form a close joint between the edges of the plates 5 and 7 at their angle or point of engagement, the engaging edge of the plate 5 is formed on a bevel and provided with fluted or corrugated projections 10, and the edge of the plate 7 is correspondingly formed and provided with recesses 11 to receive said projections. This construction effects a firm locking engagement between the abutting edges of the plates 5 and 7 to hold them against independent movement and at the same time prevent the formation of any spaces therebetween which would permit sand, grit, or dirt to pass to the space between the outer sides of the tire and felly. The inner edges of the plates 6 and 7 are inturned to form longitudinal guards or shields 12, which bear against the opposite inner edges of the felly 3 and close the spaces or crevices between the same and the side plates, thus preventing sand, grit, or dirt from working into said spaces from the inner side of the felly and causing undue wear upon the parts, as will be readily understood.

In applying the tire of a wheel-rim the portion formed by the plates 5 and 6 is first fitted in position and the plate 7 then brought in proper relation thereto and the parts secured by passing the rivets 8 through them and heading the ends of the rivets beyond the washers 9. When the parts are connected, the beveled locking portions 10 and 11 of the plates 5 and 7 will hold these parts firmly connected at the joint, while the rivets will prevent lateral displacement of either portion of the tire, and the guards or shields will coöperate therewith to prevent outward displacement. It will thus be seen that the tire will cover practically the entire surface of the felly and protect the same from shocks or blows and undue wear, while parts 12, in addition to preventing the access of foreign substances in the spaces between the felly and the tire, will prevent objectionable strain falling upon the rivets 8. A wheel provided with my improved tire will thus not only be strengthened and the period of active service prolonged, but the tire when applied increases the transverse area or lateral extent of the tire, thus adapting it to meet the requirements of certain sections relative to the use of broad tread-wheels or tires.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new is—

1. A tire comprising a tread-plate, side plates adapted to engage opposite sides of a felly, one of said side plates being formed integrally with the tread-plate and the other side plate being independent thereof, the said tread-plate and independent side plate having their contiguous edges connected by a scarf-joint, and means adapted to pass through the felly and side plate to hold the parts in assembled relation.

2. A tire comprising two portions, one portion consisting of a tread-plate, and a side plate integrally connected, and the other portion of an independent side plate, the said tread-plate and independent side plate having beveled interlocking edges, and means for securing the parts in assembled relation upon a felly.

3. A tire comprising two sections, one of said sections consisting of a tread-plate and a side plate, the latter being integral with the tread-plate, and the other section comprising an opposite removable side plate, the said tread-plate and removable side plate having beveled interlocking edges, and both side plates having inwardly-projecting portions to engage the inner surface of a felly, and means for securing the sections to a felly and hold them in assembled relation.

4. A wheel-tire comprising a tread-plate, a side plate integrally connected with one of the side edges of the tread-plate, a second side plate, the contiguous edges of said second side plate and the tread-plate having interlocking relation and forming a cogged scarf-joint, and means adapted to pass through the felly and side plate and hold the parts in assembled relation.

In testimony whereof I affix my signature in presence of two witnesses.

MARY S. GORDON.

Witnesses:
F. L. GRIFFITH,
WM. IRWIN ROSENBERG, Jr.